(12) United States Patent
Kim et al.

(10) Patent No.: US 6,285,020 B1
(45) Date of Patent: Sep. 4, 2001

(54) ENHANCED OPTICAL TRANSMISSION APPARATUS WITH IMPROVED INTER-SURFACE COUPLING

(75) Inventors: Tae Jin Kim, Milpitas, CA (US); Ajit Krishnan, Hightstown; Tineke Thio, Princeton, both of NJ (US); Henri Joseph Lezec; Thomas W. Ebbesen, both of Strasbourg (FR)

(73) Assignee: NEC Research Institute, Inc., Princeton, NJ (US)

( * ) Notice: Subject to any disclaimer, the term of this patent is extended or adjusted under 35 U.S.C. 154(b) by 0 days.

(21) Appl. No.: 09/435,132

(22) Filed: Nov. 5, 1999

(51) Int. Cl.[7] .................................................. H01J 3/14

(52) U.S. Cl. ..................... 250/216; 250/201.3; 250/307

(58) Field of Search .............................. 250/216, 201.3, 250/306, 307; 359/244, 245

(56) References Cited

U.S. PATENT DOCUMENTS

| | | |
|---|---|---|
| 3,866,037 | 2/1975 | Simpson . |
| 4,360,273 | 11/1982 | Thaxter . |
| 4,405,238 | 9/1983 | Grobman et al. . |
| 4,411,013 | 10/1983 | Takasu et al. . |
| 4,556,790 | 12/1985 | Glass et al. . |
| 4,659,429 | 4/1987 | Isaacson et al. . |
| 4,662,747 | 5/1987 | Isaacson et al. . |
| 4,815,854 | 3/1989 | Tanaka et al. . |
| 4,891,830 | 1/1990 | Iwahashi . |
| 5,250,812 | 10/1993 | Murai et al. . |
| 5,306,902 | 4/1994 | Goodman . |
| 5,351,127 | 9/1994 | King et al. . |
| 5,354,985 | 10/1994 | Quate . |
| 5,451,980 | 9/1995 | Simon et al. . |

(List continued on next page.)

FOREIGN PATENT DOCUMENTS 405240787A  9/1993 (JP) .

OTHER PUBLICATIONS

Bethe, H. A., "Theory of Diffraction by Small Holes," *The Physical Review*, vol. 66, Nos. 7 and 8, pp. 163–182 (Oct. 1944).

Caldwell, M. E. et al., "Surface–plasmon spatial light modulators based on liquid crystal," *Applied Optics*, vol. 31, No. 20, pp. 3880–3891 (Jul. 1992).

(List continued on next page.)

*Primary Examiner*—Que T. Le
(74) *Attorney, Agent, or Firm*—Andrew G. Isztwan

(57) ABSTRACT

An apparatus for enhanced light transmission through a perforated metal film is provided. The apparatus comprises a metal film having a first surface and a second surface, at least one aperture provided in the metal film and extending from the first surface to the second surface, and first and second dielectric layers. The first dielectric layer is provided substantially adjacent to the first metal film surface, and the second dielectric layer is provided substantially adjacent to the second metal film surface. The respective refractive indices of the first and second dielectric layers are substantially equal. Light incident on one of the surfaces of the metal film interacts with a surface plasmon mode on at least one of the surfaces of the metal film thereby enhancing transmission of light through the at least one aperture in the metal film. The apparatus may have a single aperture or a plurality of periodically arranged apertures, and the metal film surface may be provided with or without a periodic surface topography for further enhanced transmission. Wavelength-selective optical filters, spatial optical filters, light collectors, near-field scanning optical microscope probes and photolithographic masks are also provided.

18 Claims, 11 Drawing Sheets

U.S. PATENT DOCUMENTS

| | | |
|---|---|---|
| 5,570,139 | 10/1996 | Wang . |
| 5,633,972 | 5/1997 | Walt et al. . |
| 5,663,798 | 9/1997 | Karrai . |
| 5,789,742 | 8/1998 | Wolff . |
| 5,846,843 * | 12/1998 | Simon .................................. 436/527 |
| 5,933,233 | 8/1999 | Gunther . |
| 5,973,316 | 10/1999 | Ebbesen et al. . |
| 6,040,936 | 3/2000 | Kim et al. ............................. 359/245 |
| 6,052,238 | 4/2000 | Ebbesen et al. ...................... 359/738 |
| 6,236,033 | 5/2001 | Ebbesen et al. ...................... 250/216 |

OTHER PUBLICATIONS

Chown, M., "Tight fit," *New Scientist*, No. 2121 (Feb. 1998).

Cowan, J. J., "Aztec surface–relief volume diffractive structure," *Journal of the Optical Society of American*, vol. 7, No. 8, pp. 1529–1544 (Aug. 1990).

Ebbesen, T.W. et al., "Extraordinary optical transmission through sub–wavelength hole arrays," *Nature*, vol. 391, pp. 667–669 (Feb. 1998).

Evans, A. F. et al., "Measurement of the electrically induced refractive index change in silicon for wavelength $\lambda=1.3$ $\mu$m using a Schottky diode," *Applied Physics Letters*, vol. 56, No. 3, pp. 212–214 (Jan. 1990).

Haginoya, C. et al., "Nanostructure array fabrication with a size–controllable natural lithography," *Applied Physics Letters*, vol. 71, No. 20, pp. 2934–2936 (Nov. 1997).

Lezec, H., "Light Squeeze," *Science NOW* (Feb. 11, 1998).

Ghaemi, H. F. et al., "Surface plasmons enhance optical transmission through subwavelength holes," *Physical Review B*, vol. 58, No. 11, pp. 6779–6782 (Sep. 1998).

Raether, H., *Surface Plasmons on Smooth and Rough Surfaces and on Gratings*, Springer–Verlag, pp. 1–136 (1998) (Month unknown).

Sambles, R., "More than transparent", *Nature*, vol. 391, pp. 641–642 (Feb. 1998).

Ordal, M. A. et al., "Optical properties of the metals Al, Co, Cu, Au, Fe, Pb, Ni, Pd, Pt, Ag, Ti and W in the infrared and far infrared," *Applied Optics*, vol. 22, No. 7, pp. 1099–1119 (Apr. 1983).

Solgaard, O. et al., "High frequency attenuated total internal reflection light modulator," *Applied Physics Letters*, vol. 61, No. 21, pp. 2500–2502 (Nov. 1992).

Van Belle, M., "Photons Squeeze Through Tiny Holes," *Photonics Spectra*, pp. 36–37 (May 1998).

Villeneuve, P. R., "Light beats the diffraction limit," *Physics World*, pp. 28–29 (Apr. 1998).

Wang, Y., "Voltage–induced color–selective absorption with surface plasmons," *Applied Physics Letters*, vol. 67, No. 19, pp. 2759–2761 (Nov. 1995).

Weber, W. H. et al., "Optical electric–field enhancement at a metal surface arising from surface–plasmon excitation," *Optics Letters*, vol. 6, No. 3, pp. 122–124 (Mar. 1981).

Boardman, A.D. (ed.), *Electromagnetic Surface Modes*, Wiley–Interscience Publication, pp. 1–76, 661–724 (1982) (Month unknown).

Wood, R. W., "Anomalous Diffraction Gratings," *Physical Review*, vol. 48, pp. 928–936 (Dec. 1935).

Wood, R. W., "On a Remarkable Case of Uneven Distribution of Light in a Diffraction Grating Spectrum," *Philosophical Magazine*, vol. 4, pp. 396–403 (Jun. 1902).

Yeatman, E. M. et al., "Spatial light modulation using surface plasmon resonance," *Applied Physics Letters* vol. 55, No. 7, pp. 613–615 (Aug. 1989).

"Flooding light through tiny holes," *Science News*, vol. 153, No. 9 (Feb. 1998).

"Startling Amount of Light Gets Through Tiny Holes," John Wiley & Sons (1998) (Month unknown).

Botten, L.C. et al., "Inductive Grids in the Resonant Region: Theory and Experiment," *International Journal of Infrared and Millimeter Waves*, vol. 6, No. 7, pp. 511–575 (1985) (Month unknown).

Ulrich, R., "Far–Infrared Properties of Metallic Mesh and Its Complementary Structure," *Infrared Physics*, vol. 7, pp. 37–55 (1967) (Month unknown).

John. S., "Localization of Light", *Physics Today*, p. 32 (May 1991).

Yablonovitch, E. et al., "Hope for Photonic Bandgaps," *Nature*, vol. 351, p. 278 (1991) (Month unknown).

Dalichaouch, R. et al., "Microwave Localization by Two–Dimensional Random Scattering," *Nature*, vol. 354, pp. 53–55 (1991) (Month unknown).

Joannopoulus, J.D. et al., *Photonic Crystals*, Princeton University Press, pp. 4–7 (1995) (Month unknown).

Haroche, S. et al., "Cavity Quantum Electrodynamics," *Physics Today*, pp. 24–30 (Jan. 1989).

Betzig, E. et al.,"Near–Field Optics: Microscopy, Spectroscopy and Surface Modification Beyond the Diffraction Limit," *Science*, vol. 189, pp. 189–194 (1992) (Month unknown).

Born, M. et al.,*Principles of Optics*, Pergamon Press, pp. 401–409 (1980) (Month unknown).

Ritchie, R.H. et al., "Surface–Plasmon Resonance Effect in Grating Diffraction," *Physical Review Letters*, vol. 21, No. 22, pp. 1530–1553 (1968) (Month unknown).

Chen, Y.J. et al., "Surface Plasmons on Gratings: Coupling in the Minigap Regions," *Solid State Communications*, vol. 46, No. 2, pp. 95–99 (1983) (Month unknown).

Kitson, S.C. et al., "Full Photonic Band Gap for Surface Modes in the Visible," *Physical Review Letters*, vol. 77, No. 13, pp. 2670–2673 (1996) (Month unknown).

Lochbihler, H. et al., "Surface Polaritons on Gold–Wire Gratings," *Physical Review B*, vol. 50, No. 7, pp. 4795–4801 (1994) (Month unknown).

Drexehage, K.H., "Interaction of Light with Monomolecular Dye Layers," *Progress in Optics*, vol. 12, pp. 165–232 (1974) (Month unknown).

Roberts, A., "Near–zone fields behind circular apertures in thick, perfectly conducting screens," *Journal of Applied Physics*, vol. 65, No. 8, pp. 2896–2899 (1989) (Month unknown).

Roberts, A., "Small–hole coupling of radiation into a near–field probe," *Journal of Applied Physics*, vol. 70, No. 8, pp. 4045–4049 (1991) (Month unknown).

Wessel, J., "Surface–enhanced optical microscopy", *Journal of the Optical Society of America B*, vol. 2, No. 9, pp. 1538–1541 (1985) (Month unknown).

Fischer, U., "Submicrometer aperture in a thin metal film as a probe of its microenvironment through enhanced light scattering and fluorescence", *Journal of the Optical Society of America B*, vol. 3, No. 10, pp. 1239–1244, (1986) (Month unknown).

Specht, M. et al., "Scanning plasmon near–field microscope," *Physical Review Letters*, vol. 68, No. 4, pp. 476–497 (1992) (Month unknown).

Ulrich, R., "Interference Filters for the Far Infrared," *Applied Optics*, vol. 7, No. 10, pp. 1987–1996 (1968) (Month unknown).

Sakai, K. et al., "Metallic Mesh Bandpass Filters and Fabry–Perot Interferometer for the Far Infrared," *Japanese Journal of Applied Physics*, vol. 8, No. 8, pp. 1046–1055 (1969) (Month unknown).

Renk, K.F. et al., "Interference Filters and Fabry–Perot Interferometers for the Far Infrared", *Applied Optics*, vol. 1, No. 5, pp. 643–648 (1962) (Month unknown).

Garg, R.K. et al, "Far–infrared characteristics of multi–element interference filters using different grids," *Infrared Physics*, vol. 18, pp. 292–298 (1978) (Month unknown).

Chase, S.T. et al., "Resonant array bandpass filters for the far infrared," *Applied Optics*, vol. 22, No. 1, pp. 1775–1779 (1983) (Month unknown).

Larsen, T., "A Survey of the Theory of Wire Grids," *IRE Transactions on Microwave Theory & Techniques*, pp. 191–201 (1962) (Month unknown).

Grupp, D.E. et al., "Beyond the Bethe Limit: Tunable Enhanced Light Transmission Through a Single Sub–Wavelength Aperture," *Advanced Materials*, vol. 11, No. 10, pp. 860–862 (1999) (Month unknown).

* cited by examiner

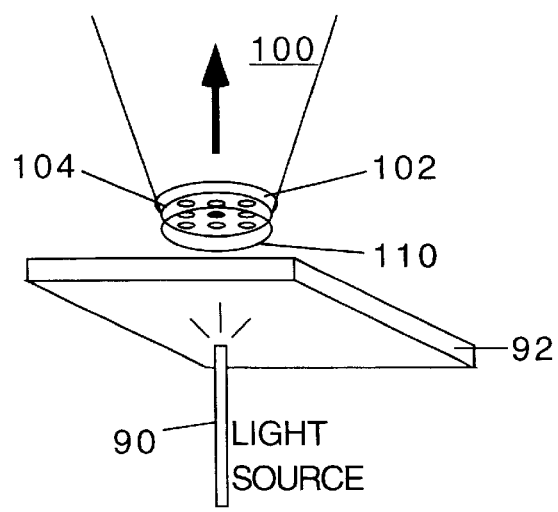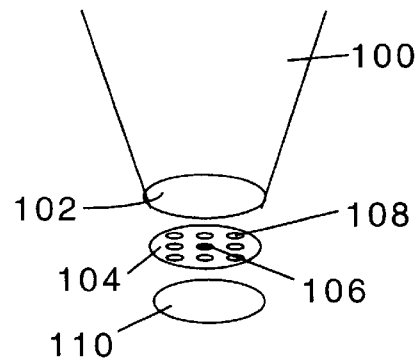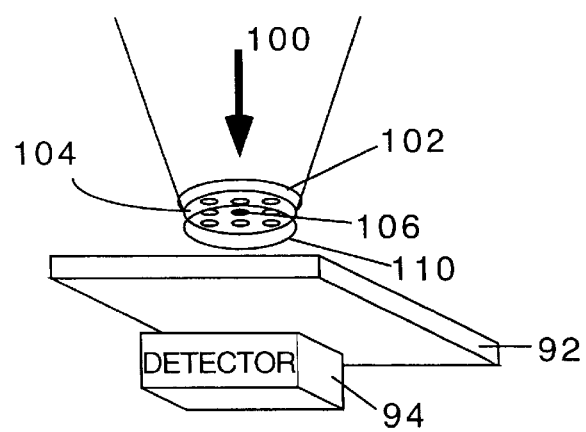
FIG. 10A
FIG. 10B
FIG. 10C

ENHANCED OPTICAL TRANSMISSION APPARATUS WITH IMPROVED INTER-SURFACE COUPLING

FIELD OF THE INVENTION

The present invention relates to the field of optics, and in particular to the enhanced transmission of light through a thin metal film perforated with one or more apertures.

BACKGROUND OF THE INVENTION

As discussed in detail in U.S. patent applications Ser. No. 08/979,432, filed Nov. 26, 1997 ("the '432 Application"), Ser. No. 09/168,265, filed Oct. 8, 1998 ("the '265 Application"), and Ser. No. 09/208,116, filed Dec. 9, 1998 ("the '116 Application") (collectively referred to herein as "the Previous Applications", each of these Previous Applications being incorporated herein by this reference), light transmission through one or more subwavelength-diameter apertures provided in a thin metal (i.e. conductive and opaque in the wavelength of interest) film can be greatly enhanced by arranging the holes in a periodic array and/or by providing a periodic surface topography on the metal film (surface features such as dimples or protrusions) in conjunction with the aperture(s). This enhancement, which can be as large as a factor of 1,000, occurs when light incident on the conductive film interacts resonantly with a surface plasmon mode.

The present invention is a light transmission apparatus wherein the light transmission efficiency is even further enhanced in comparison to previous optical transmission apparatus. In addition, the invention includes a novel near-field scanning microscope, a novel mask technology for sub-wavelength lithography, a wavelength-selective filter and light collecting device utilizing the improved enhanced light transmission apparatus.

SUMMARY OF THE INVENTION

Generally speaking, in accordance with the invention, an apparatus for enhanced light transmission through a perforated metal film is provided. The apparatus comprises a metal film having a first surface and a second surface, at least one aperture provided in the metal film and extending from the first surface to the second surface, and first and second dielectric layers. The first dielectric layer is provided substantially adjacent to the first metal film surface, and the second dielectric layer is provided substantially adjacent to the second metal film surface. The respective refractive indices of the first and second dielectric layers are substantially equal. Light incident on one of the surfaces of the metal film interacts with a surface plasmon mode on at least one of the surfaces of the metal film thereby enhancing transmission of light through the at least one aperture in the metal film. The apparatus may have a single aperture or a plurality of periodically arranged apertures, and the metal film surface may be provided with or without a periodic surface topography for further enhanced transmission. Wavelength-selective optical filters, spatial optical filters, light collectors, near-field scanning optical microscope probes and photolithographic masks are also provided.

Accordingly, an object of the invention is to provide an apparatus which provides enhanced light transmission through one or more apertures utilizing two dielectric layers substantially adjacent to the surfaces of the metal film and having substantially equal refractive indices, such that the transmission is enhanced in comparison to the transmission through the apertures in the absence of such refractive index-matched layers.

Another object of the invention is to provide an apparatus which provides enhanced light transmission through a single aperture.

A further object of the invention is to provide an apparatus which provides enhanced light transmission at selected wavelengths through one or more apertures.

A still further object of the present invention is to provide a wavelength-selective optical filter with one or more apertures which provides enhanced light transmission.

A still further object of the present invention is to provide a spatial optical filter which provides enhanced light transmission.

A still further object of the present invention is to provide a light collector with one or more apertures which provides enhanced light transmission.

A still further object of the present invention is to provide a near field scanning optical microscope probe with one or more apertures which provides enhanced light transmission.

A still further object of the present invention is to provide a photolithographic mask with one or more apertures which provides enhanced light transmission.

Other objects of the present invention will become more readily apparent in light of the following description in conjunction with the accompanying drawings.

BRIEF DESCRIPTION OF THE DRAWINGS

FIG. 10A is a perspective, schematic diagram of a near-field scanning optical microscope probe of the present invention, the probe being operated in a collection mode;

FIG. 10B is an exploded schematic diagram of a near-field scanning optical microscope probe of the present invention;

FIG. 10C is a perspective, schematic diagram of a near-field scanning optical microscope probe of the present invention, the probe being operated in an emission mode;

DETAILED DESCRIPTION OF THE PREFERRED EMBODIMENTS

Figure 1:
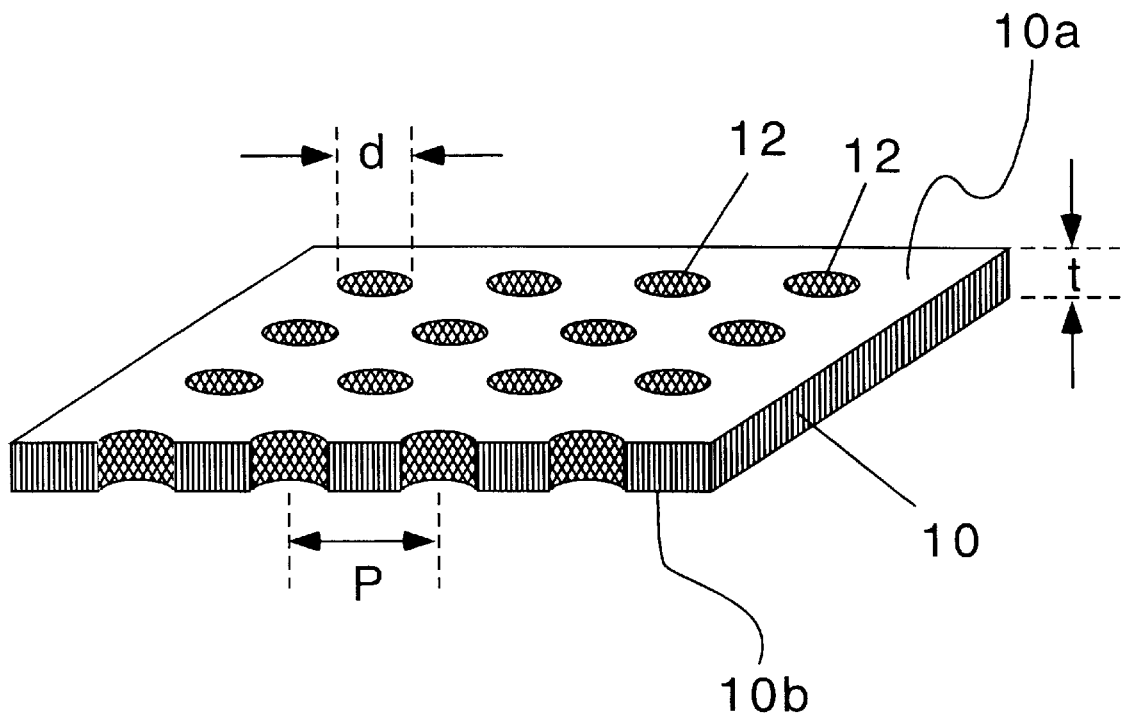
FIG. 1 is a perspective view of a perforated metal film for use in the present invention.

Referring now to the figures, FIG. 1 illustrates a thin metal plate or film which is a central component of the invention. Generally speaking, the metal film 10 has a first surface 10a and a second surface 10b. Metal film 10 includes at least one aperture or hole 12 provided therein, and may have a plurality of such apertures 12. The apertures 12 have a diameter d and, if the metal film is provided with a plurality of periodically arranged apertures, a periodicity P. Metal film 10 may comprise a metal film or a metal plate. The material comprising metal film 10 may be any conductive material that is opaque in the wavelength of interest, such as any metal or a doped semiconductor, and is preferably aluminum, silver, gold or chromium.

In the present invention, metal film 10 may include a single aperture or a plurality of apertures. Metal film 10 may also be constructed in accordance with the teachings of any of the Previous Applications to provide enhanced optical transmission through the aperture(s). For example, metal film 10 may be provided with an array of periodically arranged apertures as described in the '432 Application. In another example, metal film 10 may be provided with a single aperture or a plurality of periodically arranged apertures in conjunction with a periodic surface topography (including surface features such as dimples or protrusions) provided on one or both of the metal film surfaces as described in the '116 Application. In the case of a single aperture, a periodic surface topography should be provided on at least one surface of the metal film. In the case of a plurality of apertures, a periodic surface topography is preferably provided on at least one surface of the metal film to maximize the transmission efficiency, although the periodic surface topography is not necessary if the apertures themselves are arranged in a periodic array. The preferred size, shape and arrangement of the apertures and surface features, if any, as well as the preferred thickness of the metal film are discussed in detail in the Previous Applications.

Although the present invention preferably incorporates one or more of the metal film configurations set forth in the Previous Applications (which Previous Applications, for the sake of conciseness, will not be further discussed herein), the particular aperture configuration and/or surface topography of the metal film is not critical to the present invention. Rather, it is the properties of the media substantially adjacent to the surface of the metal film which give rise to the present invention as will be discussed below.

Figure 2:
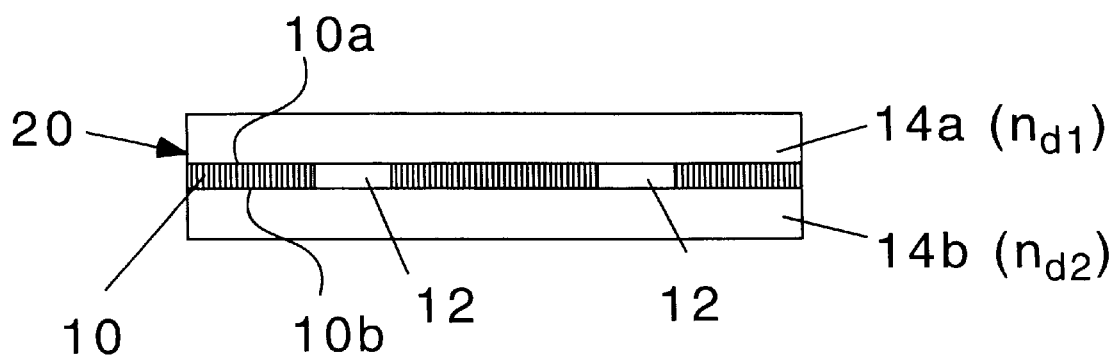
FIG. 2 is a cross-sectional diagram of an enhanced light transmission apparatus constructed in accordance with the present invention, including a perforated metal film having a first dielectric layer substantially adjacent to one of the metal film surfaces and a second dielectric layer substantially adjacent to the other metal film surface.

In the past, the effect of the materials in contact with or very near the surfaces of the perforated metal film on transmission efficiency were not well-appreciated. The inventors have now found that the transmission efficiency can be further enhanced by providing a dielectric layer substantially adjacent to each of the two surfaces of the conductive film, such that the refractive indices of the dielectric layers on each side of the metal film are substantially equal. FIG. 2 illustrates the general construction of an enhanced light transmission apparatus 20 of the present invention, which includes a metal film 10 perforated with apertures 12. The metal film 10 has a first surface 10a and a second surface 10b. A first dielectric layer 14a having a refractive index of $n_{d1}$ is provided substantially adjacent to the first surface 10a of the metal film 10. A second dielectric layer 14b having a refractive index of $n_{d2}$ is provided substantially adjacent to the second surface 10b. The enhanced transmission efficiency provided by the present invention is evident when the refractive index of the first dielectric layer is substantially equal to the refractive index of the second dielectric layer.

To analyze the operation of the invention and to compare it to devices in which the refractive indices of the first and second dielectric layers are not substantially equal, zero-order transmission spectra (that is, the wavelength-dependent intensity of the light which emerges from the sample colinearly with the incident light) were recorded as follows.

Several samples constructed as shown in FIG. 2 were prepared with first and second dielectric layers having various relative refractive indices. The metal film 10 was comprised of silver or gold having a thickness of about 300 nm, which was thermally evaporated onto a sapphire substrate or a quartz substrate comprising the first dielectric layer 14a. The metal film 10 was optically opaque. Apertures were then fabricated in an array in the metal film 10 using a Micron 9500 Focused Ion Beam machine (50 keV Ga ions, 5 nm nominal spot diameter). The individual aperture diameter d was 150 nm. The periodicity of the aperture array, P, was 0.6 $\mu$m. The transmission spectra were obtained at normal incidence in a Cary 5 photospectrometer.

Before analyzing the spectra recorded for the samples, the physical principles which give rise to enhanced light transmission through a metal film perforated with one or more apertures will be discussed to enhance understanding of the operation of the invention.

As discussed in the Previous Applications, a metal film perforated with an array of apertures and with otherwise nominally smooth surfaces (that is, without a surface with a periodic surface topography) exhibit distinct zero-order transmission spectra with well-defined peaks and strongly enhanced transmission efficiencies. See T. W. Ebbesen et al., "Extraordinary optical transmission through sub-wavelength hole arrays," Nature, Vol. 391, pp. 667–669 (Feb. 12, 1998). These maxima result from a resonant interaction of incident light with surface plasmons on both surfaces 10a and 10b of the metal film. See H. F. Ghaemi et al., "Surface Plasmons Enhance Optical Transmission Through Subwavelength Holes," Physical Review B, Vol. 58, No. 11, pp. 6779–6782 (Sep. 15, 1998).

Figure 3:
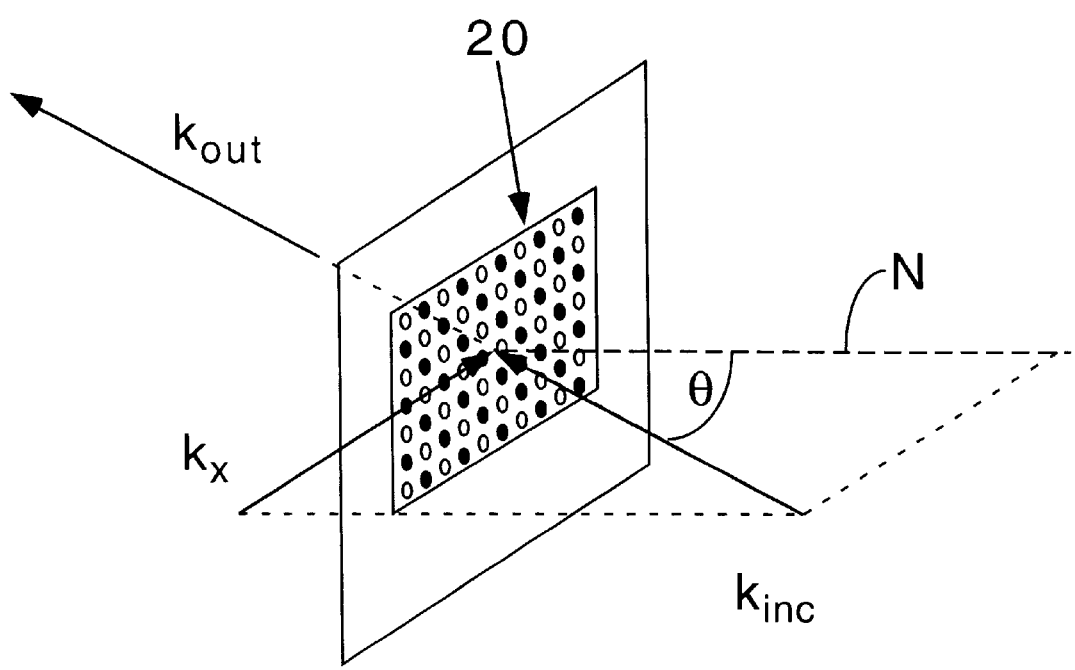
FIG. 3 is a perspective, schematic diagram illustrating the geometry of incident and output light with respect to the apparatus of the present invention.

FIG. 3 illustrates the relevant geometries of incident and output light and its coupling to surface plasmons in the enhanced light transmission apparatus of the present invention. An enhanced light transmission apparatus 20, constructed according to the present invention, is shown with incident light wavevector $k_{inc}$ and output light wavevector $k_{out}$. Wavevector $k_{inc}$ is incident on enhanced light transmission apparatus 20 at an angle $\theta$ with respect to a normal N to the surface of enhanced light transmission apparatus 20. Wavevector $k_{out}$ is parallel to wavevector $k_{inc}$. Wavevector $k_x$ is that portion of $k_{inc}$ which lies in the plane of the surface of enhanced light transmission apparatus 20.

When the incident light is p-polarized (that is, the incident electric field is parallel to the x-axis while the perforated metal film unit is rotated about the y-axis through an angle θ), the coupling of light with surface plasmons on a metal surface with any periodic structure (such as a periodic surface topography or a periodic array of apertures, or a combination of both) follows momentum conservation (see H. Raether, *Surface Plasmons on Smooth and Rough Surfaces and on Gratings*, Vol. 111 of *Springer Tracts in Modern Physics* (Springer-Verlag, Berlin, 1988)):

$$\vec{k}_{sp} = \vec{k}_x + i\vec{G}_x + j\vec{G}_y \quad (1)$$

where $\vec{k}_{sp}$ is the surface plasmon wave vector; $\vec{k}_x = \hat{x}(2\pi/\lambda)\sin\theta$ is the component of the wavevector of the incident light $k_{inc}$ which lies in the plane of the metal film as shown in FIG. 3; $\vec{G}_x$ and $\vec{G}_y$ are the reciprocal lattice vectors corresponding to the periodic lattice of the surface structure, for example a square lattice has $|\vec{G}_x|=|\vec{G}_y|=(2\pi/P)$, where P is the period of the surface features; θ is the angle between the incident wavevector kele and the surface normal N of the metal film as shown in FIG. 3; and i and j are integers. The magnitude of $\vec{k}_{sp}$ can be found from the dispersion relation (see H. Raether, supra):

$$|\vec{k}_{sp}| = \frac{\omega}{c}\sqrt{\frac{\varepsilon_m \varepsilon_d}{\varepsilon_m + \varepsilon_d}} \quad (2)$$

where ω is the angular frequency of the incident optical beam, and $\in_m$ and $\in_d$ are the dielectric constants of the metal and dielectric medium, respectively. Here, it is assumed that $\in_m<0$ and $|\in_m|>\in_d$, which is the case for a metal below the bulk plasmon energy and also for a doped semiconductor. See Raether, supra; M. Ordal e t al., "Optical Properties of the met als Al, Co, Cu, Au, Fe, Pb, Ni, Pd, Pt, Ag, Ti, and W in the infrared and far infrared," *Applied Optics*, Vol. 22) No.7, pp. 1099–1119 (Apr. 1, 1983). When the transmitted intensity is plotted on a ray scale as a function of E and $k_x$, the resulting energy-momentum (E,$k_x$) diagram (also known as a "dispersion diagram") shows a set of bands of high transmission, which set of bands reproduces the surface plasmon dispersion given in Equation (2). The transmission spectra are independent of which side of the perforated metal film is illuminated, even if the media substantially adjacent to the metal film are significantly different.

The minima in the transmission spectrum were identified as the result of Wood's anomaly, which occurs in diffraction gratings when a diffracted beam emerges tangent to the grating. See Ghaemi et al., supra; R. W. Wood, "On a Remarkable Case of Uneven Distribution of Light in a Diffraction Grating Spectrum", *Philosophical Magazine*, Vol. 4, pp. 396–402 (1902), and R. W. Wood, "Anomalous Diffraction Gratings", Physical Review, Vol. 48, pp. 928–936 (1935). The conditions for the occurrence of Wood's anomaly are similar to Equations (1) and (2), except that $\vec{k}_{sp}$ is replaced by the wavevector of the grazing (tangent to the grating) light, which has a magnitude given by $k_{diff}=[(2\pi n_d)/\lambda]$, where $n_d=\sqrt{\in_d}$, the refractive index of the adjacent media.

The geometry dependence for the occurrence of Wood's anomaly gives a set of minima which closely follow the dispersion of the surface plasmon branches in the (E, $k_x$) diagram. Since the majority of dispersion curves traverses the (E, $k_x$) plane with finite slope, it follows that for a fixed photon energy E=[(h c/λ] (or fixed wavelength), the transmitted intensity traverses maxima and minima as the angle of incidence θ is varied. Accordingly, either the wavelength or the amplitude of the transmitted light can be controlled by varying the angle of incidence θ.

Conversely, for fixed incident angle θ, the transmission exhibits minima and maxima as E (or λ) is varied. When light is incident normal to the metal film (i.e. θ=0), the wavelengths at which the maxima occur can be found by combining Equations (1) and (2), $$\lambda_{max} = \frac{P}{\sqrt{i^2+j^2}}\sqrt{\frac{\varepsilon_m \varepsilon_{dk}}{\varepsilon_m + \varepsilon_{dk}}} \quad (3)$$

and similarly for the minima:

$$\lambda_{min} = \frac{P}{\sqrt{i^2+j^2}}\sqrt{\varepsilon_{dk}} \quad (4)$$

where k=1 or 2, denoting one of the two dielectric layers.

There will be one set of maxima and minima in the transmission spectrum for each surface of the array. If the medium in contact with the metal film on one side (surface) is air and the other is sapphire, for example, then the maxima and minima in the transmission spectrum for each surface will be distinguishable from one another due to the refractive index difference between sapphire and air. See Ebbesen et al., supra, and Ghaemi et al., supra.

Referring now to FIGS. 4–7, the relationship between the respective refractive indices of the dielectric layers substantially adjacent to each metal film surface can be seen.

Figure 4:
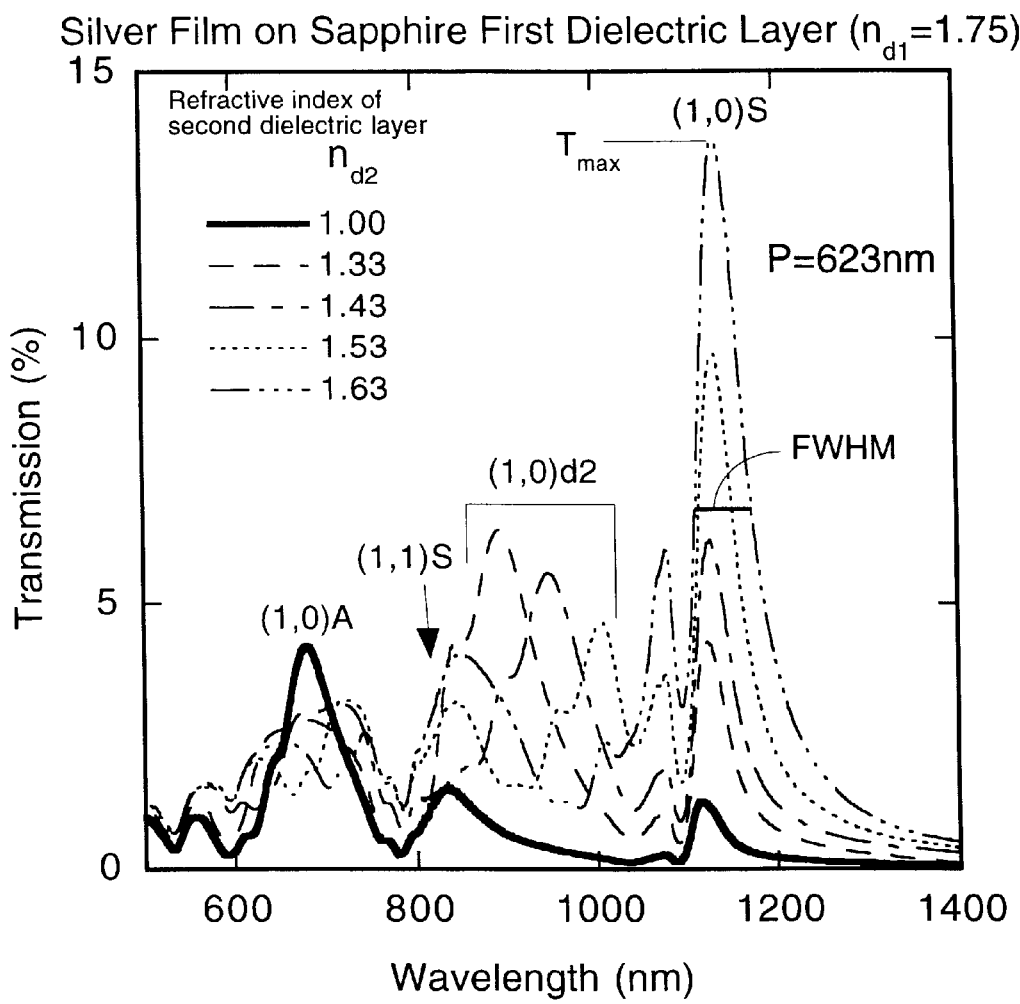
FIG. 4 is a graph showing zero-order transmission spectra of the apparatus shown in FIG. 2, wherein the metal film is a silver film and the first dielectric layer is a sapphire substrate, the graph showing the spectra for various dielectric media used for the second dielectric layer.

FIG. 4 shows typical transmission spectra recorded as described above through the apparatus of FIG. 2, in which the metal film is a silver film, the first dielectric layer is a sapphire substrate (refractive index of sapphire: $n_{d1}$ (sapphire)=$\sqrt{\in_{d1}}$~1.75), and various dielectric media having various refractive indices are used in different samples for the second dielectric layer. In particular, examples of the materials used for the second dielectric layer are: air ($n_{d2}$=1.0); water ($n_{d2}$=1.33); two commercially-available index-matching liquids ($n_{d2}$=1.43 and 1.53); and $C_{10}H_7Cl$($n_{d2}$=1.63). It should be noted that refractive index depends on the wavelength of the incident light; the refractive indices of the index-matching liquids referred to herein generally correspond nominal to a wavelength of about 587 nm. A separate spectrum is plotted for each second dielectric layer in FIG. 4.

Consider first the spectrum yielded when the second dielectric layer is air (represented by the thick solid line in FIG. 4). Using Equation 3, the transmission peaks in FIG. 4 can be assigned to either the surface plasmons on the metal film-air interface 10*b* (refractive index of air: $n_{d2}$(air)=$\sqrt{\in_{d2}}$; peaks are labeled (i, j)A or (i, j)d2 in FIG. 4) or on the metal film-sapphire interface 10*a* (refractive index of sapphire: $n_{d1}$ (sapphire)=$\sqrt{\in_{d1}}$~1.75; peaks are labeled (i,j)S in FIG. 4).

Consider next the spectra yielded when the second dielectric layer comprises materials having indices of refraction which are closer to that of sapphire, the first dielectric layer.

The spectra for these various second dielectric layer materials are represented as shown in the legend of FIG. 4. The inventors have found that as the refractive indices of the two dielectric layers 14a and 14b, which are substantially adjacent to the two metal film surfaces 10a and 10b, become closer, the transmission intensity through the apparatus increases very significantly. This is graphically shown in FIG. 4, in which the transmission peak is most greatly enchanced among the materials tested when the second dielectric layer is an $C_{10}H_7Cl$ a refractive index of $n_{d2}=1.63$, which has an index of refraction that is closest to that of sapphire among the materials tested.

Two phenomena can be seen in FIG. 4. On the one hand, the peaks associated with the second metal film surface 10b ((1,0)d2) shift to longer wavelengths as predicted from Equation (3). However, and surprisingly, the peak transmission intensities also increase, with the strongest effect being observed with the longest-wavelength peak (1,0)S associated with surface 10a despite the distortion of that peak by the presence of Wood's anomaly at λ=1100 nm. In other words, the intensity of the transmission associated with surface plasmon modes on surface 10a are affected by the energies (wavelengths) of the plasmon modes of the opposite surface 10b. As the refractive index of the dielectric layer substantially adjacent to surface 10b increases, and thus becomes closer to that of the sapphire substantially adjacent to surface 10a, the intensity of the peak at about 1130 nm also increases continuously.

Figure 5:
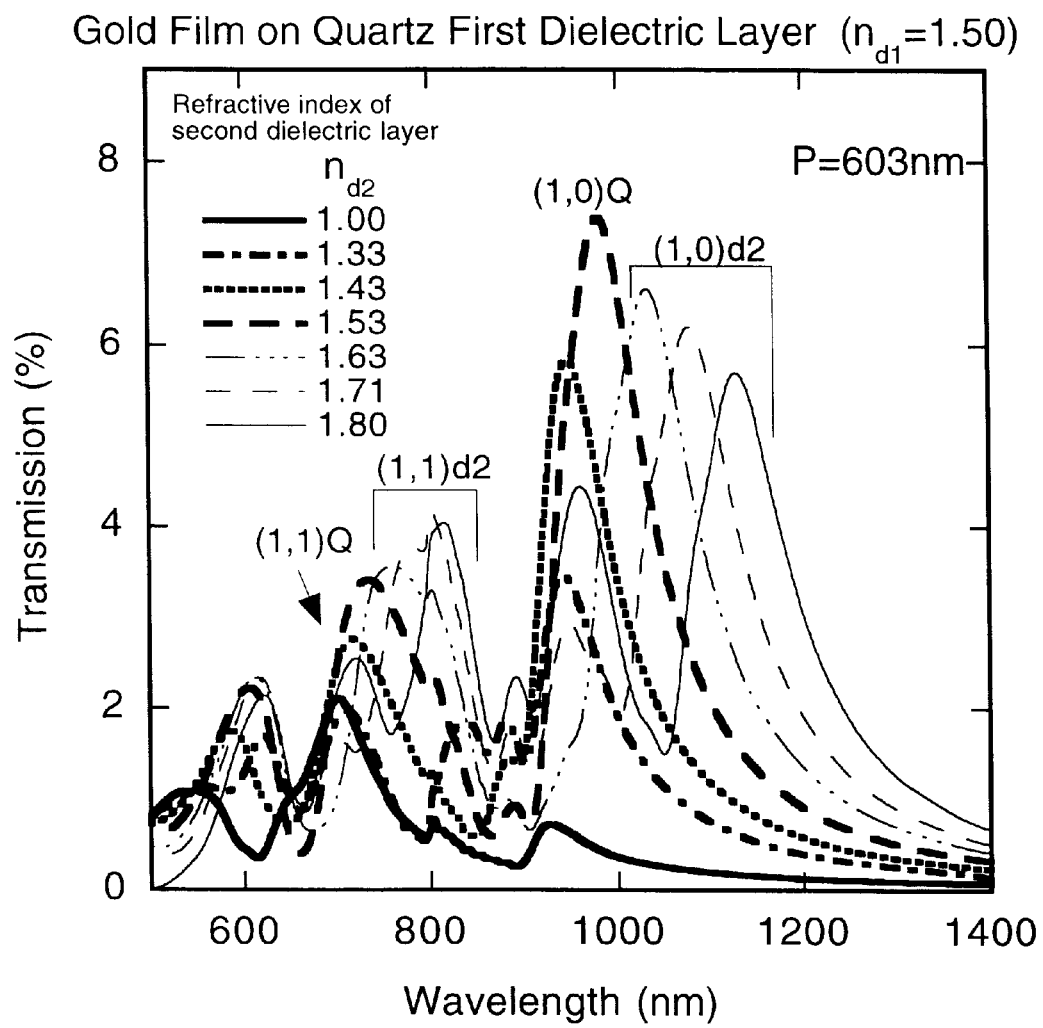
FIG. 5 is a graph showing the zero-order transmission spectra of the apparatus shown in FIG. 2, wherein the metal film is a gold film and the first dielectric layer is a quartz substrate, the graph showing the spectra for various dielectric media used for the second dielectric layer.

FIG. 5 confirms and extends the results shown in FIG. 4. FIG. 5 shows the zero-order transmission spectra through the apparatus of FIG. 2, in which the metal film is a gold film and the first dielectric layer 14a is quartz (refractive index of quartz: $n_{d1}$ (quartz)~1.5) rather than sapphire. Once again, various dielectric materials were used for second dielectric layer 14b. In particular, examples of the materials used for the second dielectric layer are: air ($n_{d2}=1.0$); water ($n_{d2}=1.33$); four commercially-available index-matching liquids ($n_{d2}=1.43, 1.53, 1.71$ and $1.80$); and $C_{10}H_7Cl$ ($n_{d2}=1.63$). As can be seen from the figure, the transmission peaks are highest when the second dielectric layer 14b comprises a material having a refractive index closest to that of quartz (in this case, the index-matching liquid having a refractive index of $n_{d2}=1.53$).

Figure 6:
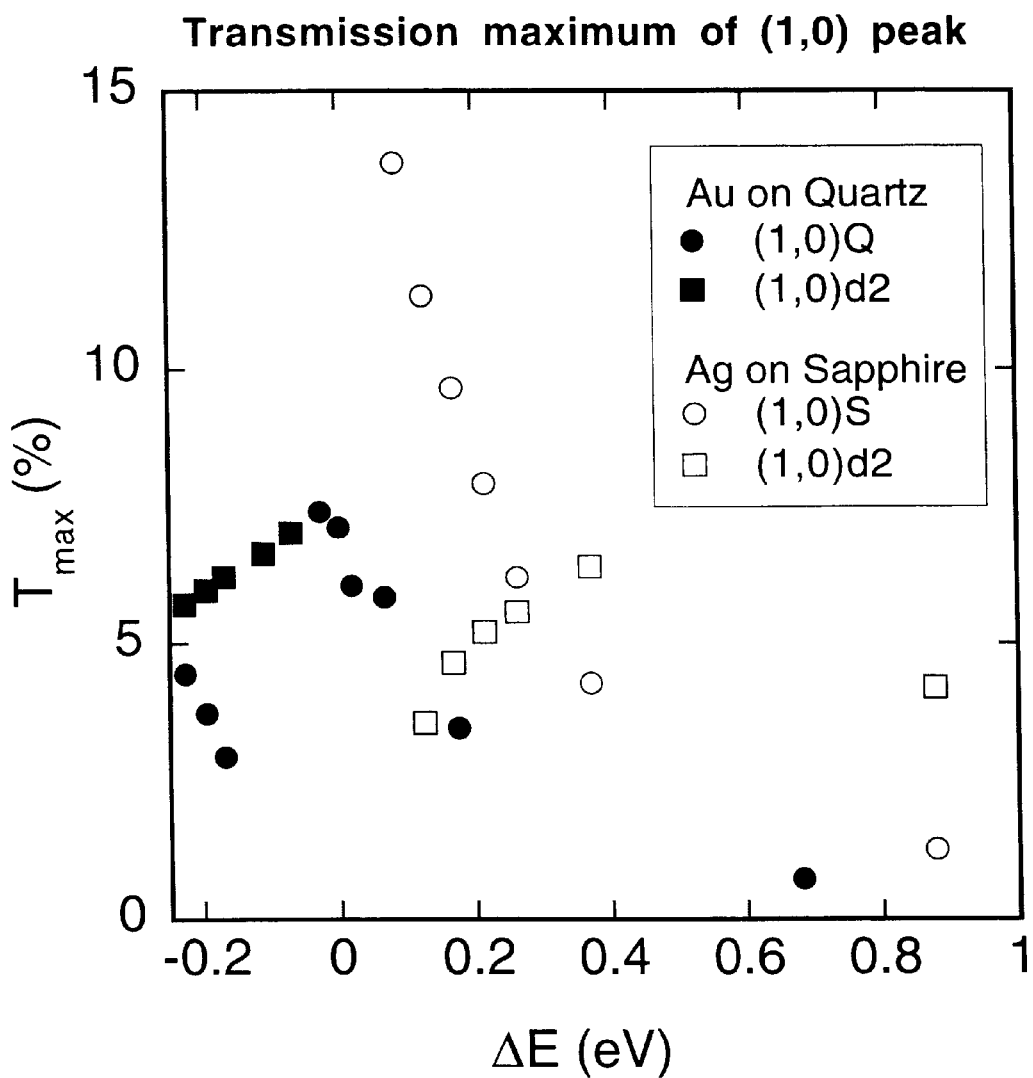
FIG. 6 is a graph showing the variation in peak transmission intensities of the various (1,0) peaks in FIGS. 4 and 5, as a function of the difference in peak energies $\Delta E$.
Figure 7:
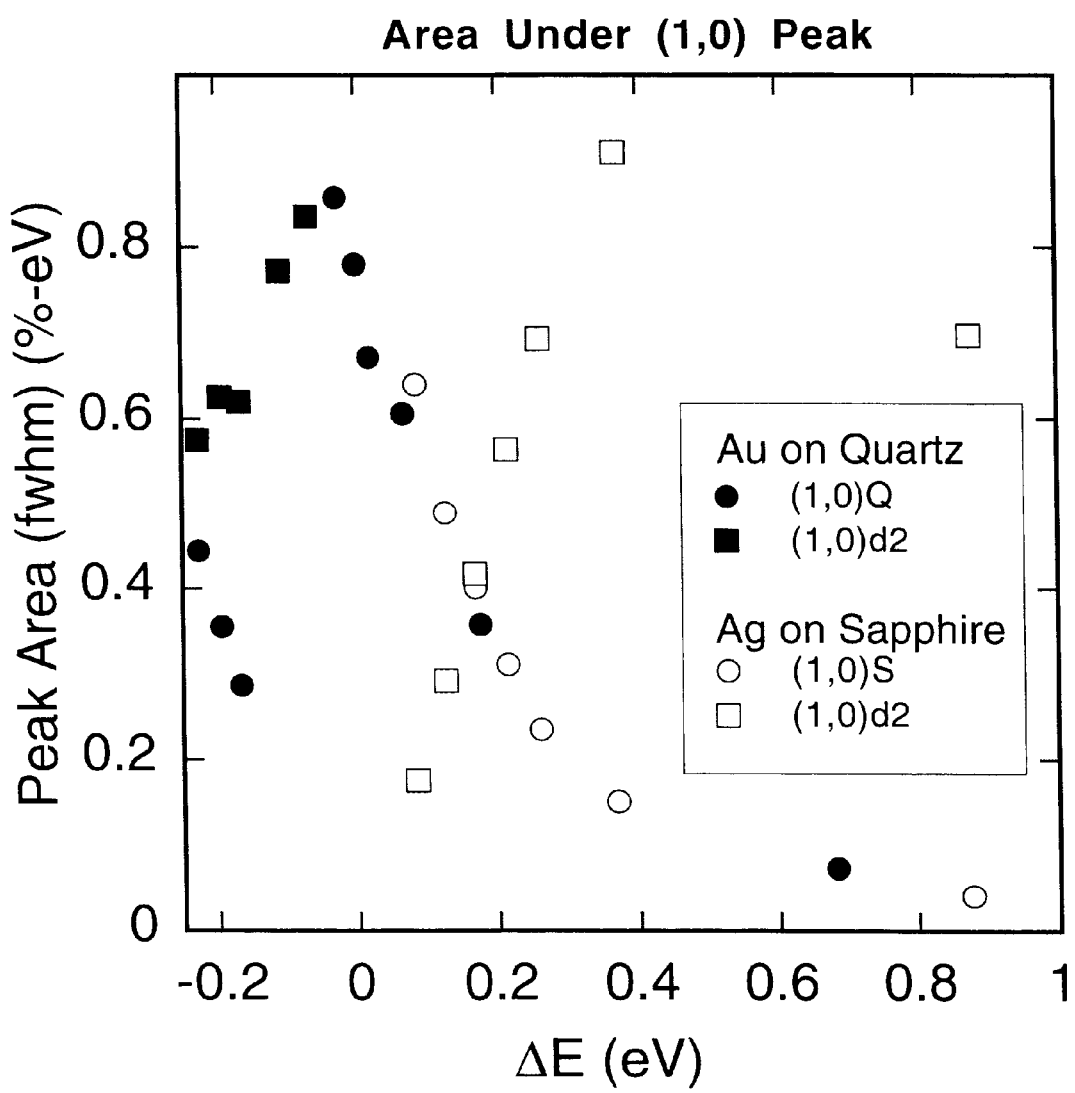
FIG. 7 is a graph showing the variation in the area of the various (1,0) peaks in FIGS. 4 and 5 integrated over the full width at half maximum of the peak, as a function of $\Delta E$.

The salient characteristics of the (1,0) peaks shown in FIGS. 4 and 5 are summarized in FIGS. 6 and 7 as functions of the difference in photon energies at which the (1,0) peaks occur on the two sides of the metal: $\Delta E = E_{d2}(1,0) - E_{d1}(1,0)$; with d1=Q,S (quartz, sapphire); decreasing ΔE corresponds to increasing $n_{d2}$; E=[(h c)/λ]. FIG. 6 shows $T_{max}$, the maximum transmission of the (1,0) peaks on the first dielectric layer d1 side (circles) and on the second dielectric layer d2 side (squares), both for the silver-on-sapphire sample of FIG. 4 (open symbols) and the gold-on-quartz sample of FIG. 5 (solid symbols). Although the apertures in the metal films here are subwavelength in diameter, the smallest peak transmission observed in these samples, $T_{max}=0.72\%$ for $n_{d2}=1.00$ on the gold-on-quartz sample, is about thirty times larger than what is ordinarily expected for a collection of 150 nm holes at this wavelength (950 nm). This already high transmission is boosted by an extra factor of ten when the indices of refraction of the two dielectric layers are substantially equal and ΔE=0.

On the ΔE<0 side ($n_{d2}>n_{d1}$), the peak transmission remains high for the (1,0)d2 peak (solid squares in FIGS. 6 and 7), but the (1,0)Q peak is suppressed (solid circles in FIGS. 6 and 7) and only regains transmission intensity when ΔE becomes sufficiently large and negative. The suppression is particularly apparent in the transmission spectrum for $n_{d2}=1.63$ (FIG. 5), where the (1,0)Q peak is barely visible at all, which will be discussed in more detail below. The observation of a maximum in the transmission enhancement as $n_{d2}$ is varied past $n_{d1}$ (that is, past $n_{quartz}$) suggests that the enhancement is driven by a resonance of the surface plasmon modes on the two opposite metal film surfaces, rather than a dielectric medium effect in which the boost comes from a reduction of the effective wavelength to ($\lambda/n_{d2}$).

FIG. 7 shows the area under the (1,0) peak. The area was evaluated numerically by taking the integral ∫T dE over the full-width-at-half-max (FWHM) of the peak. This phenomenological method was used because the presence of the Wood's anomaly made curve-fitting to a particular lineshape such as a Lorentzian, impossible. The data of FIG. 7 confirm those of FIG. 6, namely that the transmission is resonantly enhanced when ΔE=0. Both the maximum transmission and the integrated peak intensity are enhanced by a factor greater than ten, when compared to their values for $n_{d2}=1$. This again points to the occurrence of a resonance, since a simply additive effect would cause an enhancement of at most a factor of four (from doubling the electric fields, and squaring to obtain the intensity). The fact that the peak area for the (1,0)Q and (1,0)S peaks coincide may be fortuitous, since the peak widths depend not only on the imaginary part of the dielectric constant of the metals, but also on the depth of the Wood's anomaly which cuts into the peaks, and therefore on the quality of the holes and the array.

The inventors believe that the transmission spectra of the enhanced light transmission apparatus of the present invention reflect the surface plasmon modes existing on both the first surface and the second surface of the metal film. If, for instance, the physical structure of each metal film surface is the same, the transmission peaks associated with surface plasmon modes on each surface will be offset from each other in wavelength by the difference in the refractive indices of the dielectric layer in contact with each surface. In the present invention, the transmission is greatly improved by reducing the difference in the refractive indices of the medium substantially adjacent to each surface. This enhances the coupling between the surface plasmon modes on each surface since their energies become gradually closer. As a consequence, the transmission efficiency is greatly enhanced by as much as a factor of 10. The absolute amount of transmission can be tuned by the appropriate combination of dielectric layers.

As mentioned above, the resonance of the two-surface plasmon modes is very unusual, in the sense that there is a strong asymmetry. As the two transmission peaks move closer together, the longer-wavelength peak gains in transmission efficiency while the shorter-wavelength one is strongly suppressed. The suppression is strongest at resonance; this is apparent in the integrated intensity in the (1,0)Q peak at ΔE<0 (gold-on-quartz; solid circles in FIG. 7) which tends to zero at ΔE=0. The same trend is seen in the case of silver-on-sapphire (FIG. 4): As the (1,0)S and the (1,0)d2 peaks move closer (as $n_{d2}$ is increased), the (1,0)S peak gains tremendously in intensity, but the (1,0)d2 peak actually becomes weaker. In FIG. 7 the integrated intensity of that (1,0)d2 peak of the silver-on-sapphire sample (open squares) also tends to zero at ΔE=0. The asymmetry favors the longer-wavelength (lower-energy) peak independent of whether that peak is associated with a surface plasmon mode on the metal film-substrate, or the metal film-liquid interface and regardless of whether the first or second dielectric layer (d1 or d2) is illuminated.

Accordingly, the preferred embodiment of the enhanced light transmission apparatus of the present invention is effectively illustrated in FIG. 2. The apparatus 20 includes a metal film 10 having first and second surfaces 10a, 10b and perforated with at least one aperture 12. A first dielectric layer 14a is provided substantially adjacent to the first surface of the metal film, and a second dielectric layer 14b is provided substantially adjacent to the second surface of the metal film. The transmission intensity is best enhanced by ensuring that the refractive index $n_{d1}$ of the first dielectric layer is substantially equal to the refractive index $n_{d2}$ of the second dielectric layer. This remarkably improved transmission enhancement occurs not only for large arrays of apertures but also in the case of small numbers of apertures or even a single aperture.

It should be noted that while FIG. 2 appears to illustrate a solid dielectric layer substantially adjacent to each metal film surface, the invention is not limited by the physical state (solid, liquid, gas) of the dielectric layers, and FIG. 2 is intended to illustrate dielectric layers of any physical state. Thus, for example, the invention encompasses: a free-standing metal film surrounded on both surfaces by air or a vacuum; and a metal film with a solid or liquid dielectric layer on one side of the metal film and a gas or vacuum on the other side of the metal film, so long as the refractive indices of the solid material and the gas/vacuum are substantially equal. Practically speaking, however, it is typically easiest to prepare the thin metal film 10 by depositing it on a solid substrate, so one of the two dielectric layers will often (although not necessarily) be a solid material.

Aside from the metal film with at least one aperture, the invention only requires two dielectric layers having substantially equal refractive indices, each being substantially adjacent to one of the two surfaces of the metal film. According to the present invention, a dielectric layer is "substantially adjacent" to a surface of the metal film when it is in physical contact with the metal film surface or when the distance between the dielectric layer and the metal film is less than or equal to the decay length or penetration depth of the surface plasmons in the medium intervening between the dielectric layer and the metal film.

Furthermore, according to the present invention, the respective indices of the first and second dielectric layers are considered "substantially equal" as follows. A transmission peak occurs for each set of indices (i, j) according to Equation 3. Moreover, each surface of the metal film will generate its own set of peaks depending on the refractive index of the dielectric layer substantially adjacent to that metal film surface. When the peak wavelengths (or peak photon energies) of the two peaks associated with each metal film surface differ by less than the full-width-at-half-maximum ("FWHM") of the peak at the longer of the two wavelengths (that is, the width (in wavelength) of the peak at half of its maximum amplitude (in transmission)), then the refractive indices of the first and second dielectric layers are considered substantially equal. For example, consider in FIG. 5 the transmission spectrum in which the second dielectric layer is air (denoted by a thick solid line). Using the well-known relationship E=[(h c)/λ], the FWHM of the (1,0) peaks of both the metal-air surface ((1,0)A) and the metal-quartz surface ((1,0)Q) are less than 0.15 eV whereas their peak energies are separated by about 0.7 eV. Accordingly, since the difference in the peak energies (0.7 eV) is not less than the FWHM (<0.15 eV), the refractive indices of air and sapphire do not qualify as being "substantially equal" and these two dielectric materials do not produce the enhanced transmission offered by the invention. In contrast, when the second dielectric layer is an index-matching liquid having a refractive index of $n_{d2}$=1.53, the peak energies for the (1,0)Q and the (1,0)d2 peaks coincide, and ΔE=0, so ΔE<FWHM, This optimal case (ΔE=0) exhibits the largest two-surface plasmon enhancement. It should be noted that the enhancement only occurs in the transmission peak with the longer wavelength. Indeed, for the shorter-wavelength peak, the transmission tends to vanish as ΔE goes to zero (see FIG. 7).

The material used for dielectric layers 14a and 14b can be any dielectric material (including air or a vacuum) which is transparent in the wavelength of light to be transmitted. The material can be a solid, a liquid or a gas. Examples of appropriate dielectric materials include but are not limited to sapphire, quartz, glass, polymers (such as PMMA (polymethyl methacrylate)), magnesium fluoride, silicon dioxide, silicon nitride, heavily doped semiconductors, liquid crystals, water, air and organic solvents. The refractive index of the dielectric material may be fixed or it may be selectively variable as described in the '265 Application. The dielectric layers 14a and 14b may be of any thickness, but preferably are at least as thick as the penetration depth of the evanescent wave of the surface plasmons on the metal film surface (for example, a thickness of about 100 nm to 200 nm is typically appropriate for a dielectric layer of air or quartz).

Moreover, the first and second dielectric layers can be the same material, but significantly, they can also be different materials, so long as they have substantially equal refractive indices. The ability to take advantage of the transmission enhancement offered by this invention using different materials for the first and second dielectric layers is significant because it is frequently easier to construct the apparatus using two different dielectric media for the first and second dielectric layers due to manufacturing considerations. For example, it is relatively straightforward to deposit a thin metal film such as a silver film on a solid quartz substrate, but it is more difficult to coat the remaining surface of the metal film (opposite the substrate) with quartz. Thus, another material which is easier to apply (such as PMMA) having a refractive index which is substantially equal to that of quartz may be applied instead. In this way, the enhanced transmission efficiency of the invention can be realized in a readily manufactured apparatus.

The enhanced light transmission is operable with light of a wide range of wavelengths, including light in the visible, ultraviolet, infrared, far infrared and microwave regions, the operating wavelength being determined by the periodicity of the aperture/surface feature array and $n_{d1}$ and $n_{d2}$.

The enhanced light transmission apparatus of the present invention described above has many possible applications, several of which will now be described.

Figure 8:
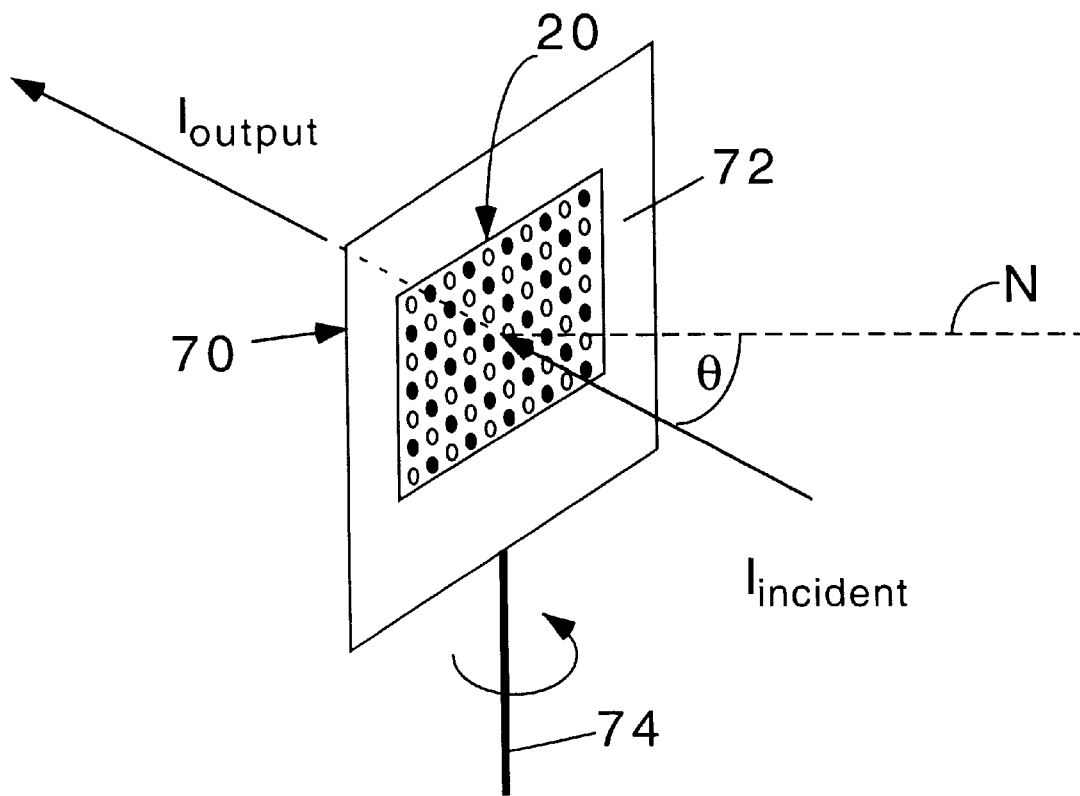
FIG. 8 is a perspective, schematic diagram illustrating an apparatus which selectively varies the transmission of light therethrough by changing the incident angle of the light, such a device being effective as a wavelength-selective optical filter.

The enhanced transmission spectra of a metal film having one or more apertures (and, optionally, at least one surface exhibiting a periodic surface topography) are dependent upon the angle of the light incident upon the surface. This angular dependence, in combination with the enhanced light transmission apparatus with improved inter-surface coupling described herein, results in an enhanced wavelength-selective optical filter 70 as shown in FIG. 8. An enhanced light transmission apparatus 20, constructed as described above, is preferably mounted to a support 72, such as a substrate, and the support is preferably mounted to a rotatable axle 74. Improved performance of this optical filter is achieved when the metal film 10 is either a free standing metal film (that is, metal film surfaces 10a and 10b are either in contact with the same gas or with a vacuum) or when both surfaces of the metal film are otherwise substantially adjacent to (and preferably are coated with) dielectric materials having substantially equal refractive indices. A periodic surface topography may also be provided on the metal film 10, if desired, but is not required. Dashed line N represents a line normal to the surface of optical filter 70, and the angle of light incident on the optical filter 70 is denoted by angle θ with respect to the normal N. By rotatably adjusting the optical filter 70, and hence changing the angle of incidence θ, the wavelength at which the light transmission peaks as a function of the angle is selectively variable. By using this property, an optical filter comprising a metal film with one or more apertures, adjustable to obtain a predetermined incidence angle, can be formed. As the incidence angle of the filter is varied, the wavelengths of light transmitted through the filter are also varied and are selectable based on the selected incidence angle. Importantly, the transmission through the optical filter 70 is enhanced by the substantially equal refractive indices of the dielectric layers on each side of the metal film.

This wavelength-selective optical filter can be used for ultraviolet, visible and longer wavelengths. The advantage of this arrangement is that the output light is colinear with the input light, thereby obviating the need to redirect the optical beam, in contrast to attenuated total reflection devices (see Raether, supra).

Another optical filter variation afforded by the present invention is a spatial optical filter. A spatial optical filter is a filter which enables variation of the wavelength and/or intensity of transmitted light at selected positions along the surface space of the filter. A spatial optical filter of the present invention utilizes an enhanced light transmission apparatus 20 as described above, wherein periodic surface features comprising a periodic surface topography are incommensurate and/or out of phase with periodic apertures. By varying the commensurability and/or the phase difference between the surface features and the apertures, the wavelength and/or intensity of transmitted light transmitted through the filter at any given position can be controlled as shown in the '116 Application. For example, the periodically arranged surface features may be positioned on the metal film so as to be either in or out of phase with the periodically arranged apertures at any given position. In this arrangement, enhanced transmission will occur through apertures where the surface features (that is, the periodic surface topography) are in phase with the periodically arranged apertures, and enhanced transmission will not occur through apertures where the surface features are not in phase with the periodically arranged apertures. The spatial optical filter of the present invention can be fixedly mounted or, if it is desired to combine the effects of the incommensurate and/or out-of phase arrays with angular transmission dependence, the spatial optical filter can be rotatably mounted as shown in FIG. 8.

The enhanced light transmission apparatus of the present invention, having one or more apertures, and optionally having at least one metal film surface with a periodic surface topography, exhibit improved wavelength selectivity as optical filters in comparison to conventional mesh arrays (that is, sparse meshes or wire arrays used as filters in the infrared or microwave regions; see R. Ulrich, "Far-Infrared Properties Of Metallic Mesh And Its Complimentary Structure," *Infrared Physics*, Vol. 7, pp. 37–55 (1967), and L. C. Botten et al., "Inductive Grids In The Resonant Region: Theory And Experiment," *International Journal of Infrared and Millimeter Waves*, Vol. 6, No. 7, pp. 511–575 (1985)). Moreover, unlike photonic band gap arrays where the material is passive and translucent at all wavelengths except at the energies within the gap, the present invention provides a material that is opaque at all wavelengths except those for which coupling occurs.

Figure 9A:
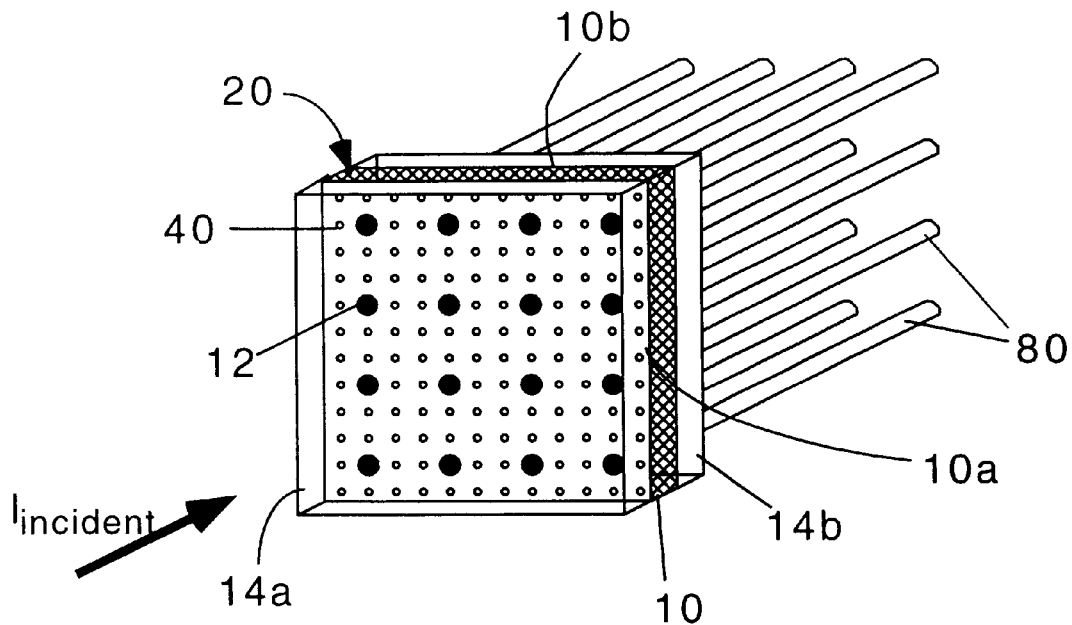
FIGS. 9A and 9B are perspective, schematic diagrams of light collectors of the present invention.
Figure 9B:
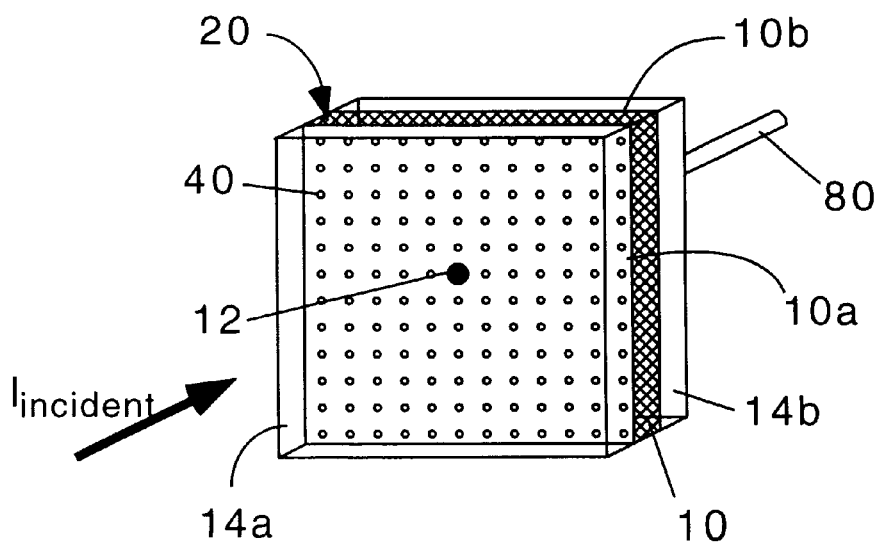

Another application of the invention is as a light beam collector as shown in FIGS. 9A and 9B. Light (indicated by the arrow labeled $I_{incident}$) is incident on an enhanced light transmission apparatus 20. The enhanced light transmission apparatus 20 includes a metal film 10 deposited on a dielectric substrate 14b. As shown in FIG. 9A, metal film 10 is provided with a plurality of apertures 12, and the metal film 10 is preferably also provided with a periodic surface topography including periodically arranged surface features 40 on at least one surface thereof, and preferably on the surface 10a of the metal film on which the light is incident. After transmission through the metal film 10, the collected light travels through the plurality of apertures 12 to corresponding optic fibers 80 which are provided in communication with, and preferably as close as possible to, the apertures. Alternatively, a single aperture may be provided in the metal film as shown in FIG. 9B, wherein a single optic fiber 80 is provided in communication with the single aperture 12 for collecting light for transmission into one optic fiber. According to this invention, the best performance is achieved when metal film 10 is provided substantially adjacent to (and preferably in contact with) the optic fiber end surface at the aperture 12, there being provided a dielectric layer having a refractive index substantially equal to that of the optic fiber material.

In the light collectors of FIGS. 9A and 9B, the intensity of the light passing through the apertures 12 and entering into the fibers 80 is enhanced by the enhanced light transmission apparatus 20 of the present invention as described above. The aspect ratio of the apertures 12 is not critical, but if surface features are provided the periodicity of the surface features 40 is important for determining the wavelength of the enhanced light collection as described above (see Eqs. (3) and (4) above, for example). Previously, it was difficult to direct light into subwavelength fibers. Complex lenses and alignment devices were used to direct the light. Since in the present invention the apertures transmit more light than the aperture surface area, the metal aperture and surface feature array acts like a light collector. As a result, coupling light into fibers (including subwavelength fibers if the apertures are of subwavelength diameter) is made efficient. Indeed, the light collector of the present invention is even more efficient than light collectors utilizing "aperture-only" arrays as opposed to the combination of one or more apertures and dielectric layers substantially adjacent to each side of the metal film having substantially equal refractive indices as used in the present invention.

Another application for the structure surface with a single aperture is in near-field scanning optical microscopy ("NSOM"). FIGS. 10A–10C illustrate near-field scanning optical microscope probes constructed according to the present invention. As shown in FIGS. 10A and 10B (in which the various metal film and dielectric layers are shown in an exploded view), a light source 90 transmits light through a specimen 92 supported by a support (not shown) into a probe 100 which acts as a subwavelength light collector. The probe 100 is a light conveying device which includes a frontal surface 102. A metal film 104, corresponding to the metal film 10 utilized in the enhanced light transmission apparatus 20 described above, is fixed to the frontal surface 102 of the probe, by deposition, for example. The frontal surface 102 of the probe preferably serves as a first dielectric layer which is substantially adjacent to the metal film 104, although a separate intervening dielectric layer could be used. The metal film 104 includes a single, subwavelength-diameter aperture 106 and preferably includes an array of surface features 108, such as dimples, for further enhancing the intensity of the light collected by the probe. If such surface features 108 are provided, they are preferably provided on the metal film surface facing the frontal surface 102 of the probe. A second dielectric layer 110 is also provided substantially adjacent to the metal film 104 as shown, the second dielectric layer having a refractive index which is substantially equal to that of the first dielectric layer. The collected light is directed through the probe as shown by the arrow in FIG. 10A for subsequent conventional NSOM signal processing. It should be noted that the periodic surface topography (if utilized) may be provided either on the side of the metal film 104 facing the sample or on the side of the metal film opposite the sample and adjacent the frontal surface 102 of the probe 100.

FIG. 10C shows an alternative embodiment of the near-field scanning optical microscope probe of the present invention, in which the probe acts as a light source (emission mode) instead of a light collector (collection mode). The construction of the probe is similar to that shown in FIGS. 10A–10. Light is directed into the probe 100 toward the frontal surface 102 as shown by the arrow in FIG. 10C. The light couples with the two dielectric layers 102 and 110 having substantially equal refractive indices provided substantially adjacent to the metal film 104 (and with the periodic array of surface features 108 on metal film 104, if provided). The light is then transmitted via the single subwavelength-diameter aperture 106 in the metal film 104, through the specimen 92, to a photodetector 94 for conventional signal processing. According to this invention, the highest transmission intensity is achieved when both surfaces of the metal film 104, in all of the above NSOM embodiments, are substantially adjacent to dielectric layers having substantially equal refractive indices.

The resolution of the NSOM is determined by the size of the aperture, so the smaller the aperture the better the resolution. However, in practice there is a practical limit to the resolution achievable because the transmission of a subwavelength-diameter aperture decreases as $(d/\lambda)^4$ as discussed above, which results in very low intensity signals. Therefore, as the aperture is made smaller to achieve finer resolution, the enhanced light transmission offered by the single subwavelength-diameter aperture NSOM probe of the present invention (in combination with the periodic surface topography) becomes increasingly advantageous as compared to conventional NSOM apertures since, in the present invention, the light transmission depends linearly on the surface area of the aperture and the wavelength of peak transmission is determined only by the period and symmetries of the surface features surrounding the aperture. In other words, the NSOM probe of the present invention is not hampered by $(d/\lambda)^4$ dependence.

Figure 11A:
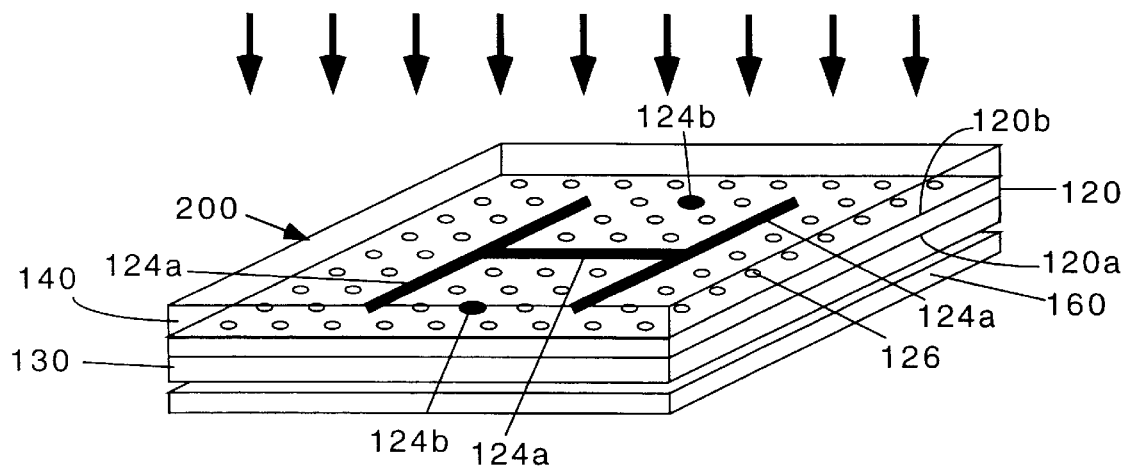
FIG. 11A is a perspective, schematic diagram showing an enhanced light transmission apparatus of the present invention utilized as a photolithographic mask according to the present invention.
Figure 11B:
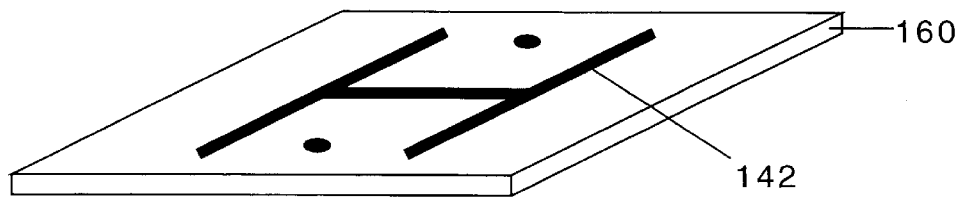
FIG. 11B is a perspective, schematic diagram showing a resulting pattern transferred onto a substrate with a photosensitive coating using the photolithographic mask of the present invention.

In another application of the invention shown in FIGS. 11A and 11B, the enhanced light transmission apparatus of the present invention with a single or several apertures can be used to make novel masks for subwavelength photolithography by virtue of the arrangement of the periodic surface features and the apertures in the metallic mask. The mask 200 comprises a metal film 120 having one or more apertures 124 provided therein. A first surface 120a of metal film 120 is provided substantially adjacent to a first dielectric layer 130, such as by depositing the metal film 120 on the first dielectric layer 130, for example. A plurality of periodically arranged surface features 126, such as dimples, are provided on at least one surface of metal film 120 so as to provide a periodic surface topography on at least one of the metal film surfaces if further transmission enhancement is desired. If such surface features 126 are provided, they are preferably provided on the metal film surface 120b on which the light 150 is incident. A second dielectric layer 140, having a refractive index substantially equal to that of the first dielectric layer 130, is provided substantially adjacent to a second surface 120b of metal film 120. Incident light 150, having a wavelength $\lambda$ which is much greater than the diameter of the apertures 124, is directed at the mask 200. Incident light 150 couples with the inter-surface coupling provided by the first and second dielectric layers 130 and 140 in combination with the metal film 120, and with the periodic surface topography if provided, and is projected through the apertures 124 in metal film 120 to yield lithographic images having features much smaller than ($\lambda/2$). The transmitted intensity through the mask is greatly enhanced by the presence of the first and second dielectric layers having substantially equal refractive indices.

To illustrate the lithographic operation of the invention, the transfer of the letter "H" and two dots onto a substrate 160 coated with photosensitive material is shown in FIG. 11A and 11B. Slit-shaped apertures 124a are fabricated in the metal film 120 in an arrangement corresponding to the image to be transferred (in this case, the letter "H"). In addition, round or "dot-shaped" apertures 124b are also provided to provide the two dots in the image. Light 150 is directed at the mask 200, whereupon the light is transmitted through the apertures 124a and 124b with enhanced transmission effect due to the first and second dielectric layers having substantially equal refractive indices (and the periodic surface topography afforded by the surface features 126, if provided) as described above. As a result, the photoresist-coated substrate 160 is exposed in the pattern of the desired image 142.

The photolithographic mask of the present invention allows subwavelength-width points or lines to be written onto photosensitive material without using deep-UV and X-ray sources. Instead, regular UV light sources, or even visible light sources, may be used. In addition, the present invention permits the use of conventional photoresists, such as UV-sensitive or visible light-sensitive photoresists, instead of X-ray sensitive photoresists.

While there has been described and illustrated various enhanced light transmission apparatus for use in certain applications, it will be apparent to those skilled in the art that variations and modifications are possible without deviating from the spirit and broad teachings of the invention which shall be limited solely by the scope of the claims appended hereto.

What is claimed is:

1. An apparatus for enhanced light transmission comprising:

a metal film having a first surface and a second surface, at least one aperture provided in the metal film and extending from the first surface to the second surface;

a first dielectric layer having a first refractive index, the first dielectric layer being substantially adjacent to the first surface of the metal film; and a second dielectric layer having a second refractive index, the second dielectric layer being substantially adjacent to the second surface of the metal film, wherein the second refractive index is substantially equal to the first refractive index, and whereby light incident on one of the surfaces of the metal film interacts with a surface plasmon mode on at least one of the surfaces of the metal film thereby enhancing transmission of light through the at least one aperture in the metal film.

2. The apparatus for enhanced light transmission of claim 1, wherein the first dielectric layer and the second dielectric layer are comprised of the same dielectric medium.

3. The apparatus for enhanced light transmission of claim 1, wherein the first dielectric layer and the second dielectric layer are comprised of different dielectric media.

4. The apparatus for enhanced light transmission of claim 1, further comprising a periodic surface topography provided on at least one of the first and second surface of the metal film.

5. The apparatus for enhanced light transmission of claim 4, wherein the periodic surface topography comprises a plurality of surface features.

6. The apparatus for enhanced light transmission of claim 1, wherein the at least one aperture comprises a single aperture.

7. The apparatus for enhanced light transmission of claim 1, wherein the at least one aperture comprises a plurality of apertures.

8. The apparatus for enhanced light transmission of claim 7, wherein the plurality of apertures are periodically arranged.

9. The apparatus for enhanced light transmission of claim 1, wherein the at least one aperture is cylindrically shaped.

10. The apparatus for enhanced light transmission of claim 1, wherein the at least one aperture is slit-shaped.

11. The apparatus for enhanced light transmission of claim 1, wherein the at least one aperture is rectangularly shaped.

12. The apparatus for enhanced light transmission of claim 1, wherein the at least one aperture is arbitrarily shaped.

13. The apparatus for enhanced light transmission of claim 1, wherein at least one of the first and second dielectric layers has a selectively variable refractive index.

14. An optical filter comprising:
   a metal film having a first surface and a second surface, at least one aperture provided in the metal film and extending from the first surface to the second surface;
   a first dielectric layer having a first refractive index, the first dielectric layer being substantially adjacent to the first surface of the metal film; and
   a second dielectric layer having a second refractive index, the second dielectric layer being substantially adjacent to the second surface of the metal film, wherein the second refractive index is substantially equal to the first refractive index, and whereby light incident on one of the surfaces of the metal film interacts with a surface plasmon mode on at least one of the surfaces of the metal film thereby enhancing transmission of light through the at least one aperture in the metal film; and
   means for adjusting the orientation of the metal film with respect to light incident thereon, such that only light of a specific range of wavelengths is transmitted through the apertures in the metal film.

15. A light collector comprising:
   a metal film having a first surface and a second surface, at least one aperture provided in the metal film and extending from the first surface to the second surface;
   a first dielectric layer having a first refractive index, the first dielectric layer being substantially adjacent to the first surface of the metal film; and
   a second dielectric layer having a second refractive index, the second dielectric layer being substantially adjacent to the second surface of the metal film, wherein the second refractive index is substantially equal to the first refractive index, and whereby light incident on one of the surfaces of the metal film interacts with a surface plasmon mode on at least one of the surfaces of the metal film thereby enhancing transmission of light through the at least one aperture in the metal film; and
   an optic fiber disposed in communication with each aperture such that light traveling through each aperture enters a corresponding optic fiber.

16. A near-field scanning optical microscope probe for use in a collection mode in a near-field scanning optical microscope including a light source and a photodetector, the near-field scanning optical microscope probe comprising:
   a light conveying device having a frontal surface disposed in proximity to the light source for receiving light from the light source, the frontal surface comprising a first dielectric layer having a first refractive index;
   a metal film having a first surface substantially adjacent to the first dielectric layer and a second surface facing the light source;
   at least one aperture provided in the metal film and extending from the first surface to the second surface; and
   a second dielectric layer having a second refractive index, the second dielectric layer being substantially adjacent to the second surface of the metal film, wherein the second refractive index is substantially equal to the first refractive index, and whereby light from the light source incident on the second surface of the metal film interacts with a surface plasmon mode on at least one of the surfaces of the metal film thereby enhancing transmission of light through the at least one aperture in the metal film, such that the enhanced transmitted light is conveyed through the light conveying device to the photodetector.

17. A near-field scanning optical microscope probe for use in an emission mode in a near-field scanning optical microscope including a light source and a photodetector, the near-field scanning optical microscope probe comprising:
   a light conveying device having a frontal surface disposed in proximity to the photodetector for transmitting light to the photodetector, the frontal surface comprising a first dielectric layer having a first refractive index;
   a metal film having a first surface substantially adjacent to the first dielectric layer and a second surface facing the photodetector;
   at least one aperture provided in the metal film and extending from the first surface to the second surface; and
   a second dielectric layer having a second refractive index, the second dielectric layer being substantially adjacent to the second surface of the metal film, wherein the second refractive index is substantially equal to the first refractive index, and whereby light from the light source is conveyed through the light conveying device to the frontal surface and is incident on the first surface of the metal film so as to interact with a surface plasmon mode on at least one of the surfaces of the metal film thereby enhancing transmission of the light through the at least one aperture in the metal film, such that the enhanced transmitted light is transmitted to the photodetector.

18. A photolithographic mask for transferring an image to a photoresist-coated substrate, the mask comprising:
   a metal film having a first surface and a second surface, at least one aperture provided in the metal film and extending from the first surface to the second surface, the at least one aperture being disposed in a pattern corresponding to the image to be transferred;

a first dielectric layer having a first refractive index, the first dielectric layer being substantially adjacent to the first surface of the metal film; and a second dielectric layer having a second refractive index, the second dielectric layer being substantially adjacent to the second surface of the metal film, wherein the second refractive index is substantially equal to the first refractive index, and whereby light incident on one of the surfaces of the metal film interacts with a surface plasmon mode on at least one of the surfaces of the metal film thereby enhancing transmission of light through the at least one aperture in the metal film so as to expose the photoresist-coated substrate according to the pattern in the metal film, thereby transferring the image.

* * * * *